United States Patent [19]
Liszka

[11] Patent Number: 4,991,408
[45] Date of Patent: Feb. 12, 1991

[54] ADIABATIC SEPARATOR

[76] Inventor: John Liszka, 2265, de Montreuil, Montreal, Quebec, Canada, H3M 1X4

[21] Appl. No.: 414,446

[22] Filed: Sep. 29, 1989

[51] Int. Cl.[5] .................................. F25B 9/00
[52] U.S. Cl. .......................... 62/401; 62/86; 62/93; 165/111; 55/267
[58] Field of Search ............... 62/401, 86; 165/111, 165/159; 55/267

[56] References Cited

U.S. PATENT DOCUMENTS

| 2,011,100 | 8/1935 | Woods | 62/86 |
| 3,129,077 | 4/1964 | Adams | 165/159 |
| 3,407,873 | 10/1968 | Ryall | 165/111 |
| 4,665,714 | 5/1987 | Keller | 62/401 |

Primary Examiner—Albert W. Davis, Jr.
Attorney, Agent, or Firm—Bacon & Thomas

[57] ABSTRACT

In an adiabatic heat exchanger, using the principle of kinetic cooling, a carrier gas is forced through a number of narrow, heat-conducting pipes wherein its velocity increases and its temperature drops. Incoming gas is forced to pass over these now cold pipes causing precipitation of a portion of the gas and an increase in temperature of the remaining portion. Such an arrangement permits for example removal of a condensible gas e.g. water vapour from a non-condensible carrier gas without the necessity of using an additional cooling medium.

20 Claims, 2 Drawing Sheets

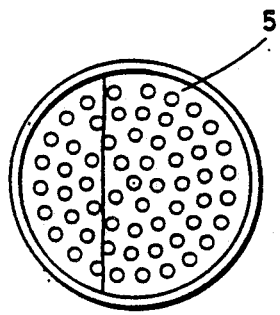
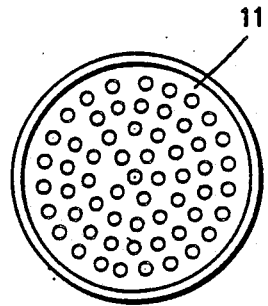
FIG. 3  FIG. 4
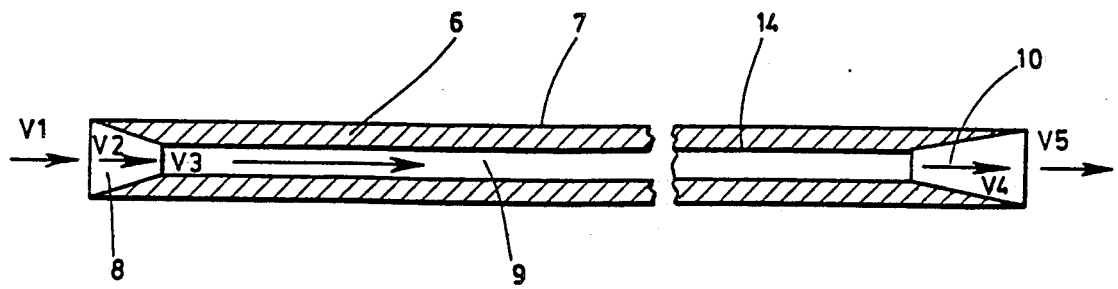
FIG. 5

ADIABATIC SEPARATOR

BACKGROUND OF THE INVENTION (i) Field of the Invention:

The present invention relates to an adiabatic separator for the separation by condensation of a portion of a homogeneous gas or of a condensible gas from a carrier gas, more particularly for the separation of water vapour from industrial flue gases.

This invention also relates to a process of such separation and in particular to a process of removal of water vapour from (dehumidification of) exhaust-flue gases especially where these latter also contain the pollutant sulphur dioxide which may be simultaneously removed by its dissolution in the condensed water, prior to discharge of the flue gases into the atmosphere.

(ii) Description of the Prior Art:

The blades of steam turbines, used for instance in nuclear power generators, suffer significant mechanical erosion ("pitting") problems owing to the impingement of condensed water droplets on the fast rotating turbine blades. This erosion requires that the turbine blades be replaced annually at high cost. It would be desirable therefore to supply such turbines with a "higher quality" steam, i.e. steam at a slightly higher temperature than usual in order to reduce the amount of droplets forming by condensation within the turbines.

Another branch of the power generation industry concerns power boilers.

The majority of power boilers in North America are coal fired units, in which ground coal is burned with air, producing hot combustion ("flue") gases.

From the initial combustion temperature of approximately 3500° F., the flue gas loses its temperature towards the boiler's exit and leaves the boiler proper at approximately 300° to 400° F. After leaving the boiler's periphery, the flue gas enters a stack and is discharged directly to the atmosphere.

These high temperatures allow considerable quantities of air pollutants to be carried into the atmosphere with the flue gas. The most prominent among all air pollutants are solid particles of coal ash and gaseous sulphur dioxide.

Contamination of the atmosphere with sulphur dioxide has proved to have devastating environmental effects as it is directly responsible for so-called "acid rain".

Ever stringent air pollution control requirements enacted by governments in recent years, have forced industries to reduce the level of solid pollutants discharged into the atmosphere. The technology that has been developed for this purpose involves a so-called "scrubbing" process.

In such an arrangement, flue gases leaving the power boiler pass through a special chamber called a "scrubber" where large quantities of cold water are injected into the flue gas stream causing coagulation of the solid ash particles. These particles subsequently collect in the bottom of the scrubber and thus are effectively removed from the gas stream. After being removed from the scrubber the wet ash is then transported to a dump site for permanent disposal.

The scrubbing process appears to be very effective in removal of solid particles from the flue gas stream, but has some undesirable side effects.

A significant portion of the cold water sprayed inside the scrubber evaporates after coming in contact with the hot flue gases. This effectively reduces the temperature of the flue gases and leaves them saturated with moisture. Upon leaving the stack the wet flue gas comes into direct contact with cold ambient air causing instant precipitation of the moisture resulting in a very environmentally objectionable plume of white "smoke".

An additional drawback of the scrubbing process is its inability to reduce the content of sulphur dioxide in the gas stream. Instead the sulphur dioxide tends to remain in gaseous form on leaving the scrubber. This is largely because the temperature of the flue gas is still too high for dissolution of sulphur dioxide in liquid water.

OBJECTS OF THE INVENTION

In the field of steam turbines, it is a first object to reduce water droplet formation in steam turbine interiors by raising the temperature of inlet steam at the expense of a small portion of the same steam removed by prior condensation.

It is another object of the present invention to provide an arrangement capable of raising the temperature of part of the inlet steam before it enters the turbine by prior removal by condensation of a small part of this steam.

In the field of power boilers, it is an object of the present invention to provide an arrangement capable of eliminating undesirable side effects of the wet scrubbing process without affecting performance of the scrubber itself.

It is another object to provide an arrangement capable of eliminating moisture from the flue gases prior to their discharge into the atmosphere, without introducing an additional cooling medium.

It is a further object to provide an arrangement capable of reducing the quantity of sulphur dioxide in the flue gas stream, prior to its discharge into the atmosphere.

In seeking solutions to these goals, the present inventor appreciated the advantages which would accrue using the principle of kinetic cooling. This principle is well exemplified by placing thumb and forefinger either side of a metal tire valve through which air is escaping. After a short period, the temperature of the valve drops as the escaping air, forced as it is to pass through a restricted orifice, travels at a much higher velocity through the valve than either inside or outside the tire. The increased velocity of the air means an increase in its kinetic energy. Following the principle of conservation of energy, this increase in kinetic energy of the air equals a loss of its heat energy. This loss of heat energy is reflected by a drop in temperature of the fast flowing gas. This, in turn, cools the heat-conducting valve through which the air is passing.

In his search for practical embodiments of this idea, it became clear to the inventor that the same adiabatic separator could be used not only for the phase separation by condensation of a portion of a homogeneous gas but also for the separation by condensation of a condensible gas from a non-condensible carrier gas.

Therefore, it became a general object of the invention to provide an adiabatic separator for the separation by condensation of a portion of a homogeneous gas or of a condensible gas such as water vapour from a heterogeneous mixture of a carrier gas with the condensible gas. Likewise, it is an object to provide for a process using this separator, particularly for water removal.

SUMMARY OF THE INVENTION

In meeting these and other objects, the present invention provides an adiabatic separator for the separation of a gas by condensation, the separator comprising:
- an enclosed vessel defining an interior space and having a closeable condensate outlet, an inlet port and an exit port;
- a plurality of heat-conducting tubes in the interior space, wherein each tube has an open end communicating with the space at a point distant from the inlet and each tube has a portion therein of internal cross-sectional area chosen to ensure a higher bulk velocity for the carrier gas in the tubes than over them, the tubes communicating hermetically with the above-mentioned exit port; and
- a means (e.g. a compressor or fan) for providing a pressure difference between said ports to force said carrier gas through said tubes.

The invention also provides a process of separating a portion of a condensible gas (preferably steam) by passing the gas through the separator mentioned above. This results in a portion of higher temperature and a condensed portion.

The invention also provides a process of separating a condensible gas from a carrier gas by passing the mixture of gases through a separator as above-mentioned.

The invention particularly provides a process of removing a water soluble gas (e.g. $SO_2$) from a carrier gas carrying both water vapour as well as the water soluble gas to be removed. Again, this process comprises passing the gaseous mixture through a separator as described above.

In particular, the invention provides a process for the removal of a high proportion of the sulphur dioxide contained in flue gases emanating from a power boiler. As before, this process comprises passing the flue gases through the separator described above, but in this embodiment the water condensed from the flue gases in the separator dissolves the sulphur dioxide to form sulphurous acid removeable from the vessel via its condensate outlet.

In one embodiment, the present invention is an arrangement similar in appearance to a conventional Tube and Shell type heat exchanger. However, the distinguishing feature of the present invention is its adiabatic function i.e. there is no net heat transfer from the input gas to any other cooling medium (e.g. cooling water) which would be the case in a typical heat exchanger. In other words, the separator creates the cooling effect necessary for precipitation of the condensible gas (e.g. water vapour) by accelerating the very same gas rather than employing an external cooling medium such as cooling water.

The present invention therefore has the advantage of not requiring an external cooling medium.

Following once more the principle of conservation of energy, the gas or gases leaving the vessel at the exit port are at a higher temperature than those entering. This facet is of great advantage for instance in the steam turbine embodiment already discussed.

The invention is now explained in terms of its use in conjunction with flue gases emanating from a power boiler. This is not to be taken as indicating that such is the only use of the present invention whose scope is only limited by the claims at the end of this disclosure.

The separator according to the invention may be attached directly downstream (with respect to flue gas direction) from a boiler furnace or there may initially be a wet scrubber (as described above) for prior removal of solid ash.

In the second case, moist flue gas leaving the wet scrubber enters the adiabatic moisture separator at one end (likenable to the "shell side" in the above discussed Tube and Shell heat exchanger). Here, it is caused to pass over the tubes and is thereby exposed to their cold surface. Moisture contained in the flue gas condenses on the cold surface of the tubes and is eventually collected at the bottom of the separator. The low temperature condensate precipitating on the cold surface of the tubes creates a functional environment for removal of sulphur dioxide, which readily dissolves in the condensate forming low concentration sulphurous acid.

Acidic condensate collected at the bottom of the separator is removed from the system through the condensate outlet specially provided for this purpose.

Upon reaching the opposite end of the adiabatic moisture separator where the narrow tubes begin, the flue gases, by now devoid of most of their moisture and sulphur dioxide content, enter the internal passages of the tubes i.e. the "tube side" in the above discussed analogy. Here, under the influence of negative pressure (suction) applied at the opposite end of tube passages, the dried flue gas is accelerated to a high velocity with corresponding drop in temperature. This drop in static temperature of the high velocity gas is responsible for the low temperature of the heat-conducting (preferably metallic) tube surface that causes condensation of moisture in the gas entering the separator on the "shell side".

After leaving the internal tube passages, the high velocity gas undergoes diffusion (slowing down) and is then directed to the stack and discharged to the atmosphere.

For the invention to operate, it is essential that the flow of gas within the tubes be at a higher bulk velocity than that flowing over the outside surface of the tubes, i.e. between the vessel inlet and where the narrow tubes begin. "Bulk" velocity means net velocity per unit volume. This velocity difference may be achieved in a number of ways, for example by ensuring that the average cross-sectional area of the tube interior is smaller than the average area spacing between tubes. By "area spacing between tubes" is meant the total perpendicular area between central axes of adjacent tubes available for gas flow.

Another way of achieving this difference in carrier gas bulk velocity is the inclusion of partial baffles in the separator vessel. These cause the carrier gas to follow a sinusoidal path perpendicular to the tubes thus increasing carrier gas contact with the tubes' exterior surfaces.

For water condensation, bulk velocity in the main vessel is preferably about 10 times lower than in the tubes. When the word "tubes" is used it is intended to include pipes of any cross-sectional form. However, it is preferred to use cylindrical tubes.

BRIEF DESCRIPTION OF THE DRAWINGS

FIG. 3 is a cross-sectional view of the same embodiment;

FIG. 4 is a cross-sectional view of the same embodiment showing the end plate;

FIG. 5 shows detail of a single tube including its internal passages.

DESCRIPTION OF THE PREFERRED EMBODIMENT

The preferred embodiment is described in relation to water vapour removal from flue gases. This does not restrict the generality of the separator which may be used for any suitable condensible gas borne by a carrier gas.

Figure 1:
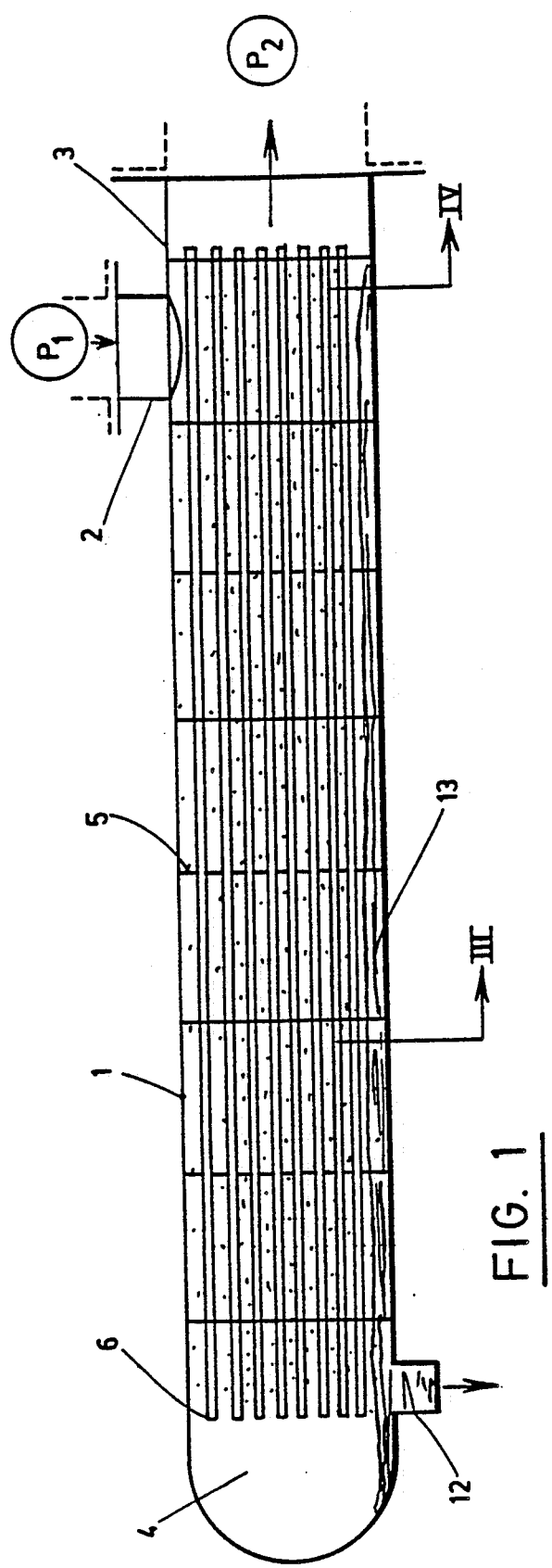
FIG. 1 is a simplified side view of one embodiment of the invention showing only the details of the adiabatic moisture separator arrangement applicable to its performance.

In FIG. 1, wet flue gas enters the inlet port (2) of the adiabatic separator vessel (1) driven by the pressure differential $P_1-P_2$ existing between higher pressure ($P_1$) of the inlet port (2) and lower pressure ($P_2$) of the exit port (3), so that the inlet port (2) and the exit port (3) are at the same end of the separator vessel (1).

Inside the separator vessel (1), the flue gas flows towards the collecting chamber (4) located at the opposite end of the separator vessel (1), guided sinusoidally by internal baffles (5) (see also FIG. 3) which also hold a bank of straight tubes (6) in place. As a whole, the tubes (6) are preferably disposed, equidistantly from each other, in a cylindrical array (see FIGS. 3 and 4).

Upon exposure to the cold outer surface (7) of the tubes (6), the moisture contained in the flue gas flowing inside the vessel (1) precipitates and trickles down to the bottom of the vessel (1), whose floor preferably slopes towards the condensate outlet (12). The condensate (13) collected in the bottom part of the separator vessel (1) generally follows the flow direction of the flue gas and eventually may be discharged from the vessel (1) through the condensate outlet (12).

Figure 2:
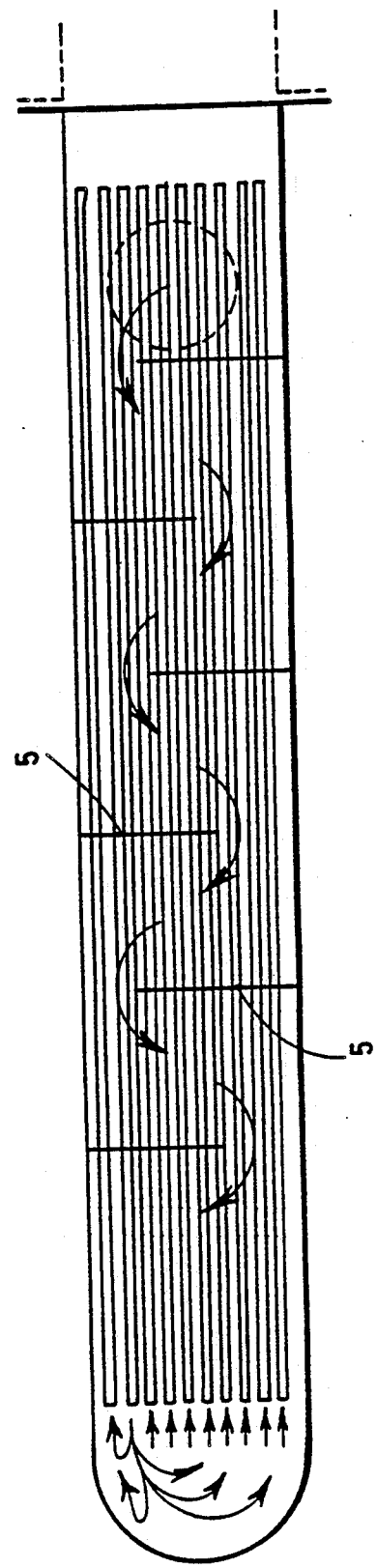
FIG. 2 is a simplified plan view of the same embodiment.

Upon reaching the collecting chamber (4), the single stream of flue gas devoid of most of its moisture content and sulphur dioxide divides into a multitude of streams (FIG. 2), prior to entering internal passages (8, 9, 10) of the tubes (6) referring now to FIG. 5. Each tube (6) preferably has an inlet end (8) of gradually reducing diameter, an outlet end (10) of gradually increasing diameter and a central portion (9) of constant but reduced interior diameter. Low velocity gas ($V_1$) enters the inlet end (8) of the tube (6) rapidly accelerating to velocity $V_2$. A maximum velocity ($V_3$) is attained in the central portion (9) of the tube (6), with a corresponding drop in static temperature as a result of partial conversion of the flue gas' internal energy into kinetic energy.

The internal surface (14) of the tube (6) being directly exposed to high velocity ($V_3$) low temperature flue gas, cools down. By the process of thermal conduction, the outer surface (7) of the tubes (6) cools down as well, providing the necessary "heat sink" for the fresh quantities of moist flue gas entering the inlet port (2) of the condenser vessel (1).

Towards the end of the central portion (9) of each tube (6), a high velocity gas ($V_3$) enters the diffuser section (10) of the tube (6), rapidly decelerating i.e. losing velocity ($V_4$) to reach its final velocity ($V_5$).

Upon reaching the outlet port (3), dried flue gas is subsequently discharged from the separator to the stack, and eventually to the atmosphere.

An internal hermetic baffle (11) separating the inlet and exit ports (2 and 3—FIG. 1) and through which pass the tubes, is preferably circular in shape (FIG. 4) to prevent detrimental leakage directly between the two ports.

EXAMPLE

The separator and a process of using it according to the invention is hereafter described in relation to the physical conditions at various points in the separator.

Inlet (flue gas) condition:

Temperature: 140° to 175° (average: about 150° F.)
Pressure: Atmospheric (14.7 psia)
Humidity: 10 to 15% (by weight) i.e. close to saturation point
Velocity: approx. 50 ft/sec (typical)
Sulphur content: 0.1 to 0.35% depending on sulphur (as $SO_2$) content of coal.

"Shell Side": (inside vessel, outside tubes)

Bulk velocity: 50 to 100 ft/sec (average: about 75 ft/sec)
Temperature: 150° F. droping to approx. 120° F.
Pressure: Atmospheric or slightly below.

Collecting chamber:

Velocity: (marginal)
Temperature: 110° F. to 130° F. (average: about 120° F.)
Pressure: Atmospheric or slightly less
Humidity: 5 to 7% by weight; or 50% relative
Sulphur content: 0.025 to 0.09% by weight (as $SO_2$)
Expected efficiency of $SO_2$ removal: 75%

"Tube Side" (inside tubes):

Velocity: 750 to 1000 ft/sec (approaching sonic velocity)
Temperature 65° F. to 90° F. (average: about 70° F.)
Pressure: 8.5 psia (6.2 psi. vacuum) depending on pressure drop
Humidity and sulphur content: As in collecting chamber Exit Port:

Velocity: 50 ft/sec (typical)
Temperature: 200° F. to 220° F.
Humidity 5 to 7% by weight or 25% relative
Pressure: 11.7 psia (3 psi. vacuum)
Sulphur content: as in collecting chamber While there have been shown and described what are at present believed to be the preferred embodiments of the invention, it will be obvious to those skilled in the art that various changes and modifications may be made to them without departing from the scope of the invention as defined by the appended claims.

What is claimed is:

1. An adiabatic separator for the separation by condensation of a portion of a homogeneous gas or of a condensible gas from a carrier gas, said separator comprising:
    an elongated vessel defining an interior space and having a closeable condensate outlet, a gas inlet port and a gas exit port;
    a plurality of heat-conducting tubes extending in said interior space, each of said tubes having an inlet end opening into said space at a point distant from said inlet port to cause incoming gases to pass over said tubes before reaching said inlet ends, each of said tubes also having an outlet end opening into said exit port, said exit port being otherwise hermetic, each of said tubes further having a substantial portion thereof within said vessel, that is of reduced internal cross-sectional area to ensure a higher velocity for said carrier gas within said tubes than over said tubes along said portions of reduced cross-section area,; and means for providing a pressure difference between said ports to force said carrier gas within said vessel and through said tubes.

2. A separator according to claim 1, additionally comprising a hermetic baffle through which pass said plurality of tubes to form a passage for said carrier gas to exit port, and wherein each tube has its outlet end communicating with said exit port behind said hermetic baffle.

3. A separator according to claim 1, wherein said tubes are parallel.

4. A separator according to claim 3, wherein said vessel has two ends and is essentially cylindrical, said tubes being in a cylindrical array, the vessel having a collection chamber at one end thereof and having said inlet and exit ports at the other end thereof.

5. A separator according to claim 1, wherein said vessel has an interior floor sloping towards said condensate outlet.

6. A separator according to claim 1, wherein each of said tubes has its inlet end of gradually reducing diameter, its outlet end of gradually increasing diameter and its portion of reduced interior diameter extending centrally between said inlet and outlet ends.

7. A separator according to claim 1, wherein said vessel has at least one partial baffle interposed between said inlet port and said open ends of said tubes.

8. A process of separating a condensible gas from a carrier gas by passing said gases through a separator according to claim 1, comprising introducing said gases into said interior space of said enclosed vessel through said inlet port, passing said gases over said heat-conducting tubes in said interior space, thereby exposing said gases to the cold surface of said heat-conducting tubes to cause condensation of said condensible gas, introducing the uncondensed gas into said tubes through said open ends communicating with said interior space, passing said uncondensed gas through tubes at a higher velocity than the velocity of the gas passing over said tubes, thereby cooling the surface of said heat-conducting tubes, and passing said uncondensed gas from said tubes through said exit port of said enclosed vessel.

9. A process according to claim 8, wherein said condensible gas is water vapour.

10. A process according to claim 9, wherein said carrier gas is a flue gas from a power boiler.

11. A process according to claim 10, wherein water condensed from said flue gases in said separator dissolves a substantial amount of sulphur dioxide from said flue gases to form sulphurous acid removable from said vessel via said condensate outlet.

12. A process according to claim 8, wherein said condensible gas is water vapor which dissolves a water soluble gas in said carrier gas, thereby removing said water soluble gas from said carrier gas.

13. A process according to claim 12, wherein said water soluble gas is sulphur dioxide.

14. A process of separating a condensible gas into a higher temperature portion and a condensed portion by passing said gas through a separator according to claim 1, comprising introducing said gas into said interior space of said enclosed vessel through said inlet port, passing said gases over said heat-conducting tubes in said interior space, thereby exposing said gases to the cold surface of said heat-conducting tubes to cause condensation of said gas into a condensed portion, introducing the uncondensed portion of the gas into said tubes through said open ends communicating with said interior space, passing said uncondensed portion of the gas through said tubes at a higher velocity than the velocity of the gas passing over said tubes, thereby cooling the surface of said heat-conducting tubes, and passing said uncondensed portion of gas from said tubes through said exit port of said enclosed vessel at a higher temperature than the temperature of the gas entering said vessel.

15. A process according to claim 14, wherein said condensible gas is steam.

16. An adiabatic separator for the separation by condensation of a portion of a homogeneous gas or of a condensible gas from a carrier gas, said separator comprising:

an essentially cylindrical enclosed vessel having two ends and defining an interior space and having a closeable condensate outlet below a collection chamber at one end of said vessel, a gas inlet port and a gas exit port at the other end of said vessel;

a plurality of heat-conducting tubes disposed in said interior space in a cylindrical array, each of said tubes having an inlet end opening into said collection chamber, each of said tubes also having an outlet end opening into said exit port, said exit port being otherwise hermetic, each of said tubes further having a substantial portion thereof within said vessel, that is of reduced internal cross-sectional area to ensure a higher velocity of said carrier gas within said tubes than over said tubes along said portion of reduced cross-section area; and means for providing a pressure difference between said ports to force said carried gas within said vessel and through said tubes.

17. A separator according to claim 16, additionally comprising a hermetic baffle through which pass said plurality of tubes to form a passage for said carrier gas to said exit port, and wherein each tube has its outlet end communicating with said exit port behind said hermetic baffle.

18. A separator according to claim 16, wherein said vessel has an interior floor sloping towards said condensate outlet.

19. A separator according to claim 16, wherein each of said tubes has its inlet end of gradually reducing diameter, its outlet end of gradually increasing diameter and its portion of reduced interior diameter extending centrally behind said inlet and outlet ends.

20. A separator according to claim 16, wherein said vessel has at least one partial baffle interposed between said inlet port and said open ends of said tubes.

* * * * *